C. L. TRAPP.
TRUCK DUMPING MECHANISM.
APPLICATION FILED FEB. 12, 1919.
1,350,087.
Patented Aug. 17, 1920.
2 SHEETS—SHEET 1.
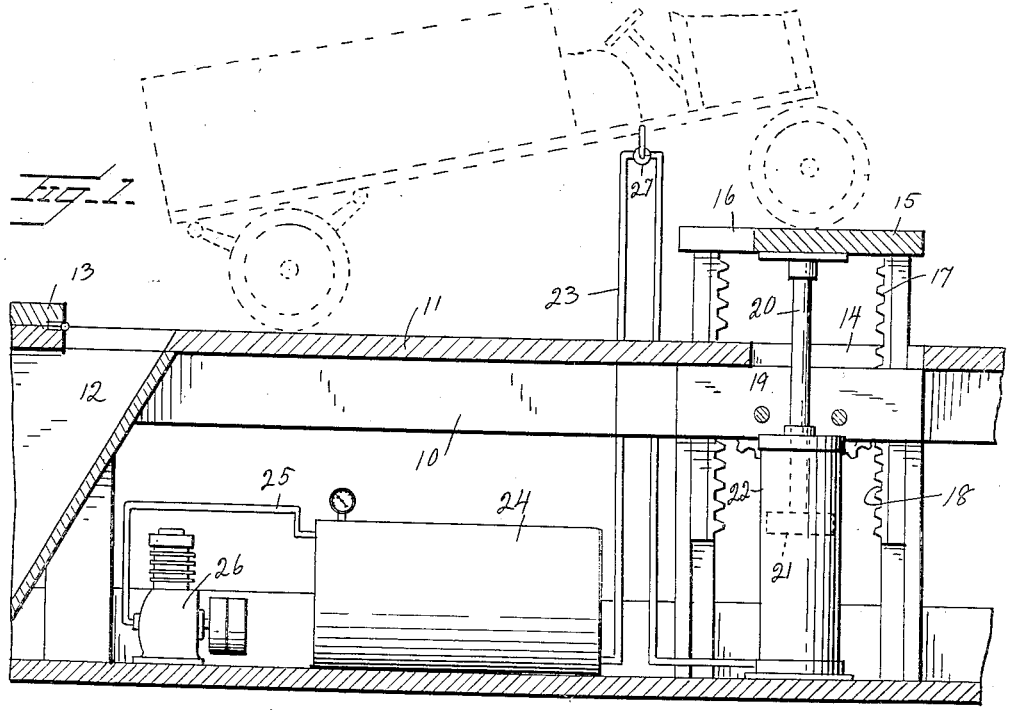
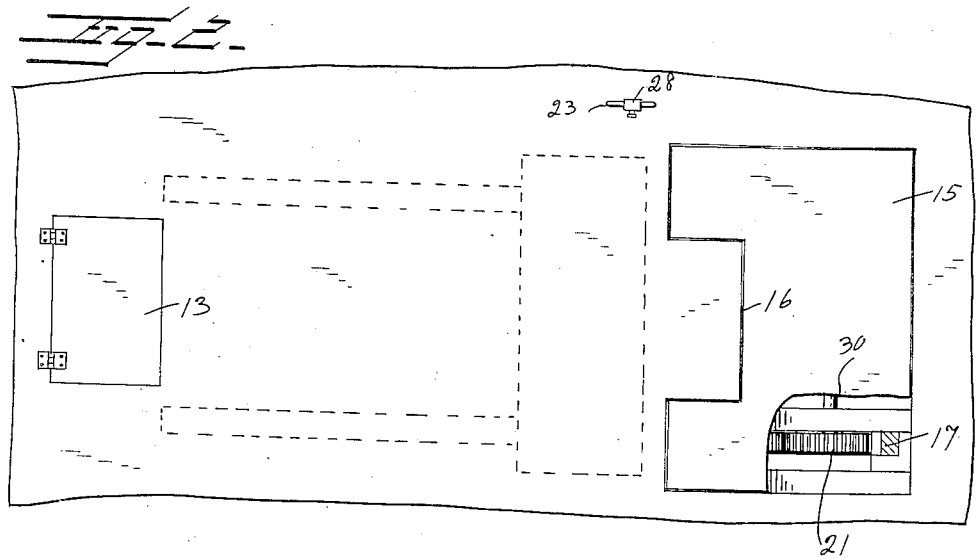
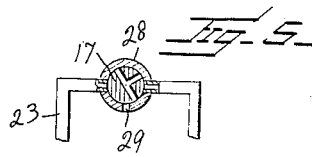
Inventor
C. L. Trapp
By Watson E. Coleman
Attorney

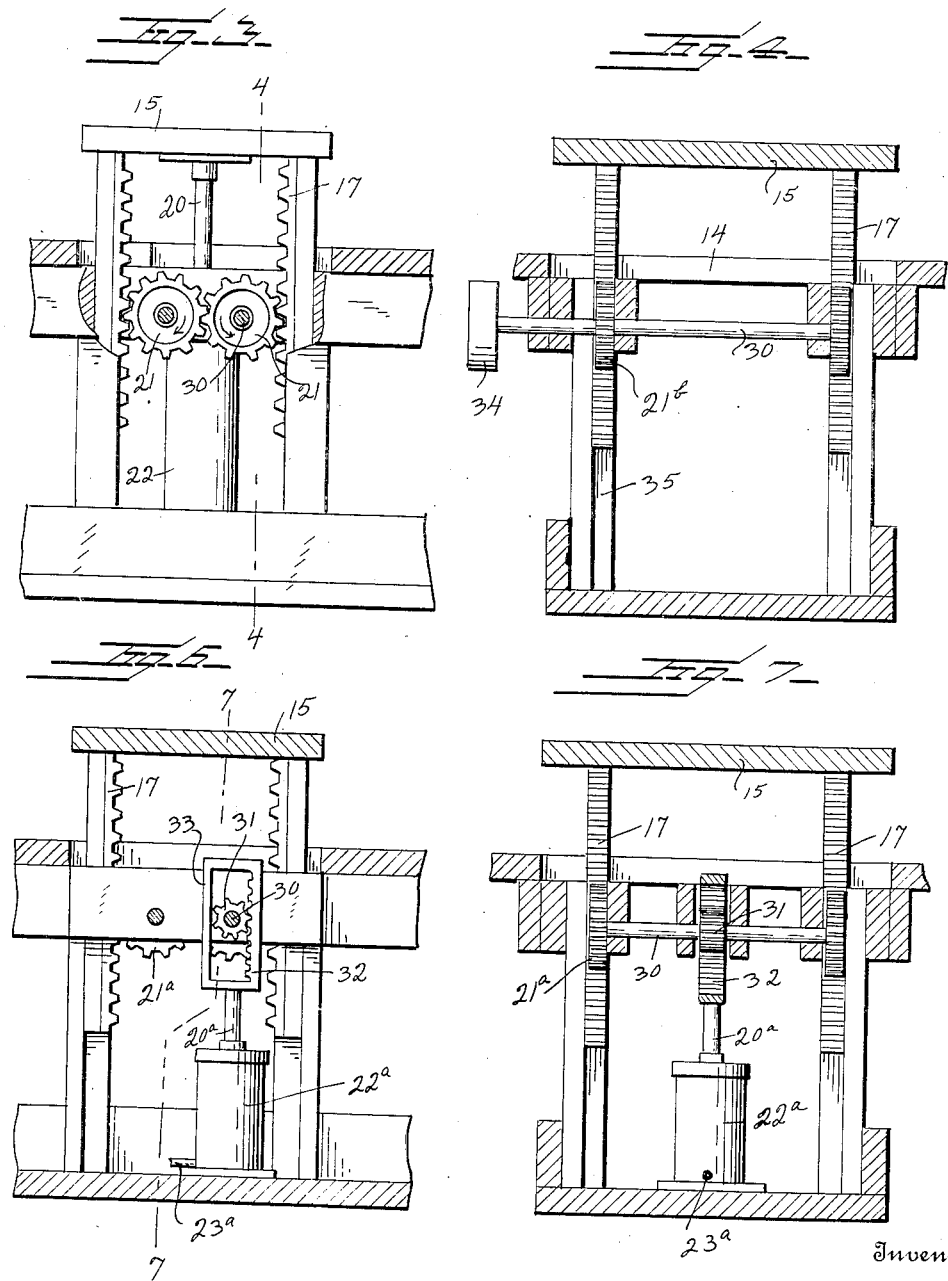

UNITED STATES PATENT OFFICE.

CHARLES L. TRAPP, OF SCHUYLER, NEBRASKA, ASSIGNOR, BY DIRECT AND MESNE ASSIGNMENTS, OF ONE-FOURTH TO GROVER C. DONOVAN, OF SCHUYLER, NEBRASKA, AND ONE-FOURTH TO LOUIS W. GOHR, OF OMAHA, NEBRASKA.

TRUCK-DUMPING MECHANISM.

1,350,087.   Specification of Letters Patent.   Patented Aug. 17, 1920.

Application filed February 12, 1919. Serial No. 276,595.

*To all whom it may concern:*

Be it known that I, CHARLES L. TRAPP, a citizen of the United States, residing at Schuyler, in the county of Colfax and State of Nebraska, have invented certain new and useful Improvements in Truck-Dumping Mechanisms, of which the following is a specification, reference being had to the accompanying drawings.

This invention relates to unloading apparatus, and particularly to mechanism for dumping trucks or other vehicles containing granular material.

The general object of this invention is to provide means whereby a truck containing grain or the like may be readily discharged or dumped by lifting the forward end of the truck.

And a further object in this connection is to provide very simple and effective means for this purpose.

Another object is to provide a construction of this character wherein only the forward end of the truck is lifted and the forward wheels rest upon a horizontal platform, while the rear wheels also rest upon a horizontal platform so that when the forward end of the truck is lifted, the truck will not tend to run backward.

A further object is to provide very simple and effective means for lifting the forward platform which supports the forward wheels of the truck, and provide means whereby the power may be equally distributed to all four corners of the platform.

Still another object is to provide a construction of this kind wherein the platform may be raised by the action of compressed air and readily controlled.

Other objects will appear in the course of the following description.

My invention is illustrated in the accompanying drawings, wherein:—

Figure 1 is a longitudinal vertical section of a truck dumping mechanism constructed in accordance with my invention;

Fig. 2 is a fragmentary top plan view thereof;

Fig. 3 is a fragmentary side elevation, partly broken away, of the frame and movable platform;

Fig. 4 is a section on the line 4—4 of Fig. 3;

Fig. 5 is a sectional view of the controlling valve used in the construction illustrated in Figs. 1 and 2;

Fig. 6 is a like view to Fig. 3, but showing a modified power transmission mechanism; and Fig. 7 is a section on the line 7—7 of Fig. 6.

Referring to these drawings, and particularly to Figs. 1 and 2, it will be seen that my dumping mechanism includes a truck supporting structure formed to provide a frame and designated generally 10, upon which is disposed the platform 11. This platform is fixed and is assumed to be at the ground level so that the truck may drive directly upon the platform. At the rear of the platform is a downwardly extending chute 12, the opening of which may be closed by a door 13, this door then being flush with the platform 11. This chute leads to any point of discharge. The platform 11 is cut away at 14, and operating in this cut-away portion 14 is a movable platform 15 which is designed to support the front wheels of the truck and lift these front wheels when the platform is elevated. It will be seen from Fig. 2 that the platform is cut away at 16 at its rear edge to accommodate the motor or transmission gear of the truck and permit this motor or transmission gear to clear the edge of the platform. This platform is mounted upon a plurality of vertical members 17, and the vertical members on opposite sides of the platform having teeth 18 confronting each other. Shafts 19 extend through the supporting beams 20 of the frame and carry upon them the intermeshing gear wheels 21 having the same diameter.

I desire that this platform 15 shall be raised either by air pressure or purely mechanical means, and in Figs. 1 to 3 I show the platform as being raised by a piston rod 20 having a piston 21 operating within a cylinder 22. This cylinder is connected by a pipe 23 to a storage tank 24 wherein compressed air is stored and this storage tank is, in turn, connected by a pipe 25 to an air compressor 26. This air compressor 26 might be connected directly to the pipe 23 or any other means may be used for compressing air within the tank 24, or a water or other liquid pump might be used for pumping liquid into the cylinder 22. I do not wish to be limited to any particular means for this purpose. The pipe 23 preferably extends up above the platform 11 to any convenient height and is there provided with a valve 27 which, as illustrated in Fig. 5, is a three-way valve coacting with a casing 28 having oppositely disposed ports communicating with the pipe line 23 and also having an exhaust port 29. When this valve is turned in one position, communication will be established through the valve between the compressed air tank 24 and the cylinder 22. When the valve is turned in another position, however, communication will be established between the cylinder 22 and the exhaust port 29 so as to discharge air from the cylinder. Thus, when the valve is turned in one position, air will pass through the tank 24 into the cylinder 22 and act to lift the piston, the rate of elevation being dependent upon the degree to which the valve 27 is opened. If it is desired to lower the platform, then the valve is turned to connect the cylinder with the exhaust port and the rate of descent of the platform will depend upon the extent of opening of the valve. The intermeshing gear wheels 21 acting upon the corner members 17 prevent any tipping or unsteadiness of the platform 15 so that all four corners of the platform will rise together and lower together.

As before stated, I do not wish to limit myself to a construction wherein the piston rod 20 is connected directly to the platform 15, as it is within the purview of my invention to otherwise communicate power to the platform from a compressed air tank. Thus, in Fig. 6 I show the platform 15 as being raised by gear wheels 21ª which are rotated by power derived from compressed air. Thus, upon one of the shafts 30 upon which these gear wheels 21 are mounted, I may mount a pinion 31 and provide a rack 32 mounted upon a piston 20ª operating within the cylinder 22ª. This rack 32 is provided with a yoke 33 which extends over the gear wheel 31 so as to prevent the rack from becoming disengaged from the gear wheel. The cylinder 22ª is, of course, connected by means of the pipe 23ª to the source of compressed air or other fluid. It will be obvious that the operation of this form of my construction is precisely the same as heretofore described, the outlet and inlet of the operating fluid being controlled by such a valve as that shown in Fig. 5.

I do not wish to limit myself to the use of fluid under compression as motive power, but may use purely mechanical means for raising or lowering the platform 15, and in Figs. 3 and 4 I have shown the platform 15 as provided with the rack members 17 as previously described. I have illustrated the transverse shafts 30ª carrying the gear wheels 21ᵇ, one of the shafts 30 being extended, as at 34, so that it may be connected to any suitable source of power. I have not illustrated any means of connecting the motor to this shaft and providing for a direct or reverse movement of the shaft, as it will be obvious that this may be accomplished by many transmission gears commonly used today, as, for instance, a reversible friction drive, or by the provision of a multiplying gear, this shaft may be rotated by hand to thus elevate or lower the platform 15 by hand.

It will be seen that in all forms of my construction the platform 15 is supported or carries at its corners the vertical members 17 provided with racks, and that these vertical members 17 operate in guides 35.

It will be noted that the front end of the truck is elevated with perfect safety, owing to the fact that both the front and rear wheels stand on level platforms and, therefore, in order for the truck to run backward, it will be necessary for the front wheels to move at an angle to the plane of the bottom of the truck, or in effect, run at an upward inclination relative to the bottom of the truck. The same is true of the rear wheels, and thus the truck will remain perfectly steady while the platform 15 is being elevated or lowered. It cannot move backward, as the truck must pull against its own weight in order to do so. The platform 11 with the platform 15 is made large enough to receive any length of auto truck and at the same time deliver the grain at the chute 12. In the construction illustrated in Fig. 6, the gear wheel connecting immediately with the rack 32 is much smaller than the gear wheels 21ª, thus increasing the power and making it possible to use a much shorter piston and air cylinder than where direct pressure is used to raise the platform, as in Fig. 1.

This dumping mechanism has been found in practice to be extremely effective and convenient. The load can be raised to any desired angle and held at any height by the manipulation of the control valve 27. The load can be elevated or lowered at any desired speed, eliminating any possible jar which might be injurious to the truck or engine, and this unloading mechanism can be used and operated without interference with any ordinary wagon dump used in connection therewith. The platform, because of the four gear wheels engaging with the four racks 17, must rest on a level at all times regardless of the position of the load thereon, whether in the center or at one side of the platform. Of course, it will be obvious that the details of this construction may be modified in many ways without departing from the spirit of the invention.

The dotted lines, indicated on the upper face of the platform in Fig. 2, indicate the position of the dump logs commonly used for dumping farm wagons and are designed to show that this dumping mechanism may be installed without interfering with the usual manner of dumping farm wagons.

I claim:—

1. A dumping mechanism comprising a fixed truck supporting platform, a horizontal, vertically movable platform coacting therewith and adapted to support the forward wheels of the truck, said movable platform having downwardly extending guiding rack bars at its four corners, intermeshing gear wheels engaging said rack bars, and power operated means for raising or lowering the movable platform.

2. A dumping apparatus including a fixed truck supporting platform, a vertically movable platform coacting therewith and adapted to support the forward wheels of the truck, downwardly extending rack bars connected to the corners of the movable platform, vertical guides in which said rack bars move, transverse shafts disposed below the platform, two pairs of intermeshing gear wheels mounted upon said shafts to rotate therewith and engaging said racks, and power operated means for raising or lowering the platform.

3. A vehicle dumping mechanism including a fixed truck carrying platform and having a discharge opening, a horizontal, vertically movable platform coacting therewith and forming part thereof, normally lying flush with the fixed platform and adapted to support the forward wheels of a truck, guiding racks depending from the corners of the movable platform, guides in which said racks move, transverse shafts disposed below the movable platform and having gear wheels engaging said racks and intermeshing with each other, a cylinder, a piston operating therein, the cylinder being connected to a source of fluid under pressure, manually operated means for controlling the passage of fluid from and to the cylinder, and means for transmitting power from the piston to said movable platform to cause it to raise or lower.

4. A vehicle dumping mechanism including a fixed elevated truck carrying platform, a movable platform coacting therewith and forming part thereof normally lying flush therewith and relatively remote from the discharge opening, guiding racks depending from the corners of the movable platform, guides in which said racks move, transverse shafts disposed below the platform and having gear wheels engaging said racks and intermeshing with each other, a cylinder, a piston operating therein, the cylinder being connected to a source of fluid under pressure, manually operated means for controlling the passage of fluid from and to the cylinder, and means for transmitting power from the piston to said movable platform to cause it to raise or lower, and including a gear wheel mounted upon one of said shafts, and a rack engaging said gear wheel and connected to the piston.

5. A vehicle dumping mechanism of the character described including a fixed, relatively elevated platform having a discharge opening and cut away at a point relatively remote from the discharge opening, a movable platform fitting said cut away portion and adapted to be disposed flush therewith or raised with relation thereto, guiding racks depending from the movable platform and extending through the opening in the fixed platform, a cylinder disposed beneath the fixed platform and having a piston engaging the movable platform whereby it may be raised or lowered, gear wheels meshing with said guiding racks and with each other, and means for admitting compressed air to or forcing it from the cylinder including a pipe extending upward through the fixed platform and then extending downward into the lower end of the cylinder, and a valve in said pipe.

In testimony whereof I hereunto affix my signature in the presence of two witnesses.

CHARLES L. TRAPP.

Witnesses:
Geo. W. Wertz,
Florence M. Slater.